(12) United States Patent
Eikkula

(10) Patent No.: US 7,512,151 B2
(45) Date of Patent: Mar. 31, 2009

(54) PROVIDING A NETWORK NODE WITH SERVICE REFERENCE INFORMATION

(75) Inventor: Jari Eikkula, Espoo (FI)

(73) Assignee: Nokia Corporation, Espoo (FI)

( * ) Notice: Subject to any disclaimer, the term of this patent is extended or adjusted under 35 U.S.C. 154(b) by 987 days.

(21) Appl. No.: 09/835,821

(22) Filed: Apr. 17, 2001

(65) Prior Publication Data

US 2003/0086410 A1 May 8, 2003

(51) Int. Cl.
*H04J 3/22* (2006.01)

(52) U.S. Cl. .................. 370/467; 370/466; 370/265

(58) Field of Classification Search .............. 370/254, 370/255, 265, 270, 433, 443, 455, 463, 464–467; 709/212, 217, 223; 379/111, 112.01
See application file for complete search history.

(56) References Cited

U.S. PATENT DOCUMENTS

| | | | | |
|---|---|---|---|---|
| 6,735,621 | B1 * | 5/2004 | Yoakum et al. | 709/218 |
| 6,868,090 | B1 * | 3/2005 | Ma et al. | 370/469 |
| 6,961,332 | B1 * | 11/2005 | Li et al. | 370/352 |
| 7,043,246 | B2 * | 5/2006 | Uskela | 455/445 |
| 7,136,373 | B2 * | 11/2006 | Ma | 370/352 |
| 7,243,162 | B2 * | 7/2007 | O'Neill et al. | 709/245 |
| 7,277,421 | B1 * | 10/2007 | Pershan | 370/352 |
| 7,333,505 | B2 * | 2/2008 | Yoakum et al. | 370/466 |

FOREIGN PATENT DOCUMENTS

| | | |
|---|---|---|
| WO | WO 99/60801 | 11/1999 |
| WO | WO 00/42760 | 7/2000 |
| WO | 0079756 A2 | 12/2000 |
| WO | WO 01/37523 | 5/2001 |
| WO | WO 01/86968 | 11/2001 |
| WO | WO 01/91445 | 11/2001 |
| WO | WO 0191445 A1 * | 11/2001 |

OTHER PUBLICATIONS

Cookson et al., "3G Service Control," BT Technol. J., Jan. 2001, vol. 19, No. 1, pp. 67-79.
Grech, "Providing Seamless Services for VoIP Mobile Data Networks Using CAMEL/IN Concepts," 3G Mobile Communication Technologies, Conference Publication No. 471, IEE 2000, pp. 133-137.

* cited by examiner

*Primary Examiner*—Wing F. Chan
*Assistant Examiner*—Mark A. Mais
(74) *Attorney, Agent, or Firm*—Pillsbury Winthrop Shaw Pittman LLP

(57) ABSTRACT

Service reference information is added to an IP telephony signaling protocol message and the IP telephony signaling protocol message is then sent to the network node in order to provide a network node using the IP telephony signaling protocol, e.g., SIP, with service reference information needed for billing purposes.

20 Claims, 1 Drawing Sheet

PROVIDING A NETWORK NODE WITH SERVICE REFERENCE INFORMATION

FIELD OF THE INVENTION

The invention relates to relaying service reference information with an IP (Internet Protocol-based) telephony signaling protocol used in IP-based networks. One example of service reference information is CAMEL-related information. CAMEL (Customized Applications for Mobile network Enhanced Logic) is an intelligent network-based solution standardized by ETSI (European Telecommunications Standards Institute) as one of the GSM (Global System for Mobile communications) phase 2+ services. One example of an IP telephony signaling protocol is SIP (Session Initiation Protocol) which is developed by IETF (Internet Engineering Task Force).

BACKGROUND OF THE INVENTION

Transferring data associated with various time-critical applications in IP-based networks has been an attractive topic in recent years. It has also been one of the main goals in the development of the mobile communications systems, and especially in so-called third generation mobile communications systems, such as UMTS (Universal Mobile Communications System). A mobile communications system refers generally to any telecommunications system which enables wireless communication when users are moving within the service area of the system. A typical mobile communications system is a Public Land Mobile Network (PLMN).

One UMTS system based on IP technology is the so-called 3GPP AII-IP system, which is defined in the $3^{rd}$ generation partnership project 3GPP. One standard used for IP telephony implementation in 3GPP AII-IP is SIP. SIP is an application-level control protocol which allows the establishment, alteration and interruption of multimedia connections and voice over IP connections. IP telephony is a general term covering services from standard voice telephony utilizing an IP protocol (VoIP, Voice over IP) to multimedia applications using IP data, voice and video.

In the 3GGP AII-IP system, the intelligent network service implementation may be based on the CAMEL architecture. One of the problems to be solved when implementing CAMEL to the network using SIP, is how to transfer at least mandatory CAMEL-related information used for charging purposes between network nodes/functions using SIP. In the GSM system CAMEL-related information is obtained by sending a routing number request. However, in SIP such mechanism does not exists.

One solution to the above problem is to provide SIP with a routing number request mechanism corresponding to the one used in GSM to transfer CAMEL-related information. A problem with this kind of a solution is -that it would require new messages in SIP.

BRIEF DESCRIPTION OF THE INVENTION

An object of the present invention to provide a method and an apparatus for implementing the method so as to solve the above problem. The object of the invention is achieved by a method and an arrangement which are characterized by what is stated in the independent claims. The preferred embodiments of the invention are disclosed in the dependent claims.

The invention is based on realizing the problem and solving it by the idea of modifying an existing IP telephony signaling protocol message, such as a SIP INVITE message or a message acknowledging it, so that the service reference information, such as CAMEL-related information, is transmitted in the IP telephony signalling protocol message. An advantage of the invention is that by modifying an existing IP telephony signalling protocol message service reference information will be transmitted without any new messages.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The present invention can be applied to any communications system where service reference is to be transferred between network nodes using an IP telephony signalling protocol. Such systems include 'the third generation mobile communications systems', such as UMTS, the corresponding mobile communications systems and combination systems utilizing mobile user equipment and a fixed IP-based network. The service reference information may be CAMEL-related information, OSA-related (Open Service Architecture) information or Parlay API-related (Application Protocol Interface) information, for example. Examples of IP telephony signalling protocols are H.323, SIP and a SIP evaluation called SIP+. In the following the invention will be described by using the 3GPP AII-IP system utilizing CAMEL and SIP as an example without restricting the invention thereto. The specifications of mobile communications systems, and the third generation mobile communications systems in particular, progress quickly. This may require additional changes to the invention. Therefore, all words and expressions should be interpreted broadly and they are intended for illustrating, and not restricting the invention.

Figure 1:
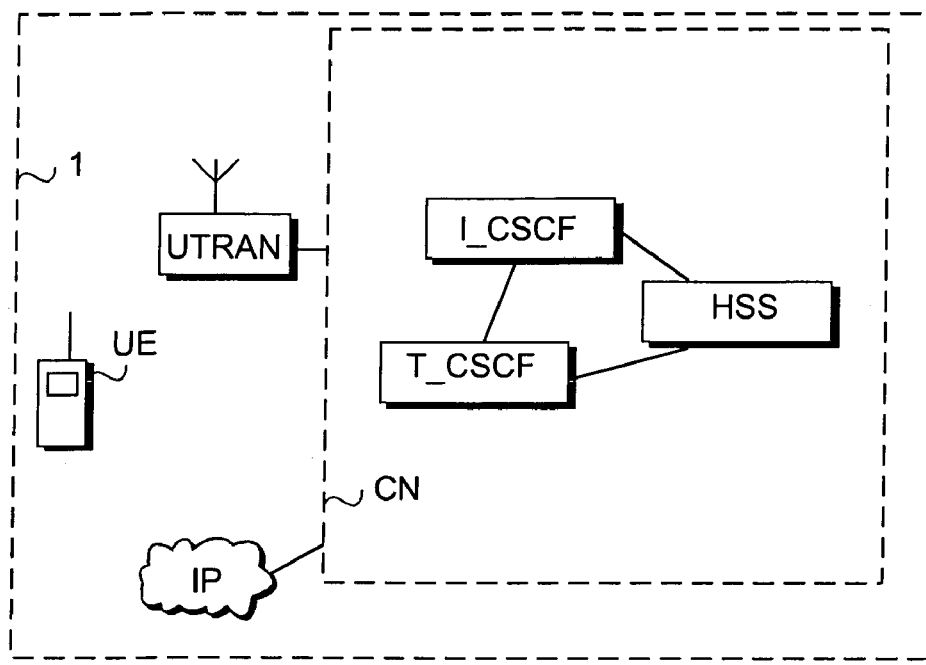
FIG. 1 is a block diagram illustrating a simplified network architecture.

FIG. 1 shows a simplified network architecture and illustrates only those elements of the communications system 1 relating to a called subscriber B that are essential for understanding the invention. Network nodes shown in FIG. 1 are logical units the implementation of which may differ from what is described here. It is obvious to a person skilled in the art that the system 1 also comprises other functions and structures, which need not be described in greater detail here.

In the 3GPP AII-IP system 1, a difference is made between an access layer and a telephony layer, which may both have their own operators. Usually the access layer provides the user with a wireless access to external networks, such as IP networks (Internet Protocol), and the services thereof, such as Internet telephony (IPT, IP Telephony), such that the telephony layer is responsible for control. The IP telephony is in practice invisible to network nodes of the access layer, and they do not participate in the routing of the IP telephony. However, there are signalling connections from each level to various service platforms, such as a CAMEL Service Environment (CSE), billing centers and an IP telephony application server. The different layers and service platforms are not shown in FIG. 1.

In the example of FIG. 1, the system 1 comprises a core network CN and a UMTS terrestrial radio access network UTRAN. The UTRAN is formed of a group of radio network subsystems (not shown in FIG. 1) which are connected to the core network CN. A radio network subsystem can be based on the GPRS (General Packet Radio Service) of the GSM system, for example. The core network CN can be connected to external networks, such as IP networks IP. In the example of FIG. 1, the core network comprises a home subscriber server HSS, an interrogative call state control function I_CSCF and a serving call state control function T_CSCF, which serves the subscriber B registered in the network. The HSS and the I_CSCF locate in the home network of the subscriber B whereas T_CSCF is either in the home network or in a visited network.

The serving call state control function T_CSCF is a network node in which IP telephony user equipment, and thus subscribers, are registered and via which the signalling associated with the IP telephony, such as SIP, is transferred. The T_CSCF participates in controlling a call made by the user equipment and in supporting the establishment of calls terminating at the user equipment registered in the network, as well as in supporting the triggering of the services associated with these calls when the triggering conditions are fulfilled. In other words, the T_CSCF controls call establishment and contains, among other things, a function corresponding to an intelligent network service switching function and the call state models of the IP telephony, by which the call establishment is controlled together with other network nodes, such as a service control point, the CSE and IP telephony application servers (these are not shown in FIG. 1). The T_CSCF is the network node through which the signalling of a mobile-terminating call is transferred from the actual IP network IP, for instance. The T_CSCF usually contains a subscriber database which logically corresponds to the visitor location register of the GSM system. The T_CSCF is also responsible for producing billing information. The serving call state function may also be called a terminating call state control function, an originating call state control function or a visited call state control function. The serving call state control function corresponds to the visited mobile switching center of the GSM system. The T_CSCF operation according to the invention is explained in greater detail in connection with FIG. 2.

The interrogative call state control function I_CSCF participates in controlling the establishment of a call made to a subscriber, and it determines how the mobile-terminating call is to be routed. In other words, it is authorized to route calls terminating at user equipment. Thus, the I_CSCF functions as an entry point for a mobile-terminating call to the subscriber B and corresponds to a gateway mobile switching center (GMSC) of the GSM system. The I_CSCF interrogates the subscriber B's HSS in order to detect routing information and routes the call on the basis of the address obtained from the HSS. The I_CSCF may also produce billing information relating to the subscriber B. The I_CSCF operation according to the invention is explained in greater detail in connection with FIG. 2.

The functionality of various call state control functions, I_CSCF and T_CSCF, is not affected by the type of the access network. This means that the access network may be a wireless network, as in the example of FIG. 1, or a wired network.

The home subscriber server HSS logically corresponds to the home location register of the GSM system, and subscriber data for each subscriber of the home network are stored therein either permanently or semi-permanently such that the subscriber data are combined with a subscriber identifier, which in the GSM system, for example, is IMSI (International Mobile Subscriber Identity). When a subscriber registers into the network, the HSS transmits the subscriber's service information, which may comprise CAMEL subscriber information CSI, to the serving call state control function T_CSCF. When there is no address of a serving call state control function for a subscriber, the HSS transmits the subscriber's service information as a routing instruction to the I_CSCF.

Subscriber B's user equipment UE comprises the actual terminal and a detachably connected identification card USIM, also called a subscriber identity module. In this context, the user equipment UE generally means the entity formed by the subscriber identity module and the actual terminal. The actual terminal can be any equipment or a combination of various devices capable of communicating in a mobile communications system.

In addition to prior art means, the network nodes comprise means for implementing the functionality described below. The current network nodes comprise processors and memory, which can be utilized in the functions according to the invention. All changes necessary for implementing the invention can be made as added or updated software routines, by means of application-specific integrated circuits (ASIC) and/or programmable circuits, such as EPLD, FPGA.

The mandatory CAMEL-related information for billing includes a CAMEL call reference number generated in the GSM network by the GMSC and the address of the GMSC (which corresponds to the I_CSCF). The mandatory CAMEL-related information is needed when billing information of the called subscriber B is collected and Charging Data Records (CDRs) are generated in the T_CSCF and/or I_CSCF. The mandatory CAMEL-related information is added to each CDR and on the basis of the information the CDRs relating to a call are combined in the charging center. The same mandatory CAMEL related information is needed also, when a CAMEL-based service is triggered in the T_CSCF and/or I_CSCF. In future some other CAMEL-related information may be needed. A network node may comprise a definition or definitions indicating which CAMEL-related information should be added, generated, used and/or in which context the CAMEL-related information should be used.

Figure 2:
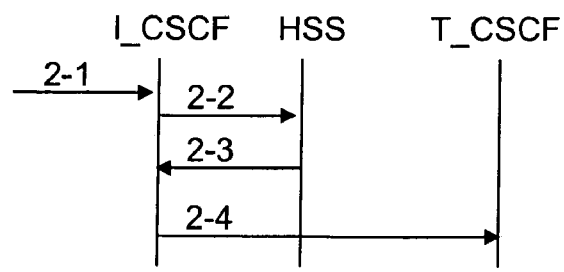
FIG. 2 illustrates signalling according to the invention.

FIG. 2 illustrates signalling according to the invention. In the example of FIG. 2 it is assumed for clarity's sake that the called one, i.e. subscriber B, is registered in the T_CSCF and that the mandatory CAMEL-related information for billing is added and generated in the I_CSCF.

When the subscriber A makes a call to the subscriber B, the O_CSCF sends a SIP INVITE message 2-1 to the I_CSCF of the subscriber B. The SIP INVITE message is an example of an IP telephony signalling protocol initiating a session. The I_CSCF is found on the basis of a host-part of the logical IP address, i.e. IP address in the form a@x.y where the host-part is after the @-sign. If the address of the subscriber B is B@try.com, the logical address of the I_CSCF of the subscriber B is icscf.try.com.

Upon reception of message 2-1, the I_CSCF requests from the HSS a routing address for the subscriber B in message 2-2. The HSS sends at least the routing address, i.e. the address of the T_CSCF, to the I_CSCF in message 2-3. The I_CSCF of the invention then generates a CAMEL call reference number and codes it with its own address to a digit string and adds the digit string to an INVITE message. After that the I_CSCF sends the INVITE message 2-4 to the T_CSCF, stores the CAMEL-related information and uses it when generating CDRs, for example.

When the T_CSCF of the invention receives message 2-4, it separates the CAMEL-related information from message 2-4, decodes it to obtain the CAMEL call reference number and the address of the I_CSCF, stores them and uses them when generating CDRs or triggering a CAMEL-related service, for example. Thus, both the I_CSCF and the T_CSCF have the same CAMEL-related information used in CDRs.

The I_CSCF is preferably arranged always to add to the INVITE message 2-4 CAMEL-related information, i.e. its address and the CAMEL call reference number, as a coded digit string or as such. The advantage of this is that the I_CSCF does not need information on the status of the terminating CAMEL subscription information, i.e. it does not need to know whether the address and the CAMEL call reference number is needed. However, the I_CSCF may be arranged not to add the CAMEL-related information to each INVITE message.

In a first preferred embodiment of the invention the I_CSCF adds the CAMEL-related information to the SIP header of the INVITE message as one of the subheaders.

The following SIP INVITE message header is one example of a SIP INVITE message header according to the first preferred embodiment of the invention, which could be forwarded from the I_CSCF to the T_CSCF. The header comprises 9 subheaders in this example. The IP addresses are logical IP addresses for clarity's sake. The eighth subheader (starting by word CAMEL) includes CAMEL-related information, i.e. the address of the I_CSCF and the CAMEL call reference number generated by the I_CSCF, coded in a digit string the T_CSCF understands. The T_CSCF then decodes the digit string. In other embodiments of the invention each piece of CAMEL-related information may be given in separate subheaders or in one subheader in a predetermined order so that information is separated by a comma, for example. It is also possible to code only part of CAMEL-related information and send the other part of the CAMEL-related information uncoded.

INVITE sip:ue_b@home_b.com SIP/2.0
    Via: SIP/2.0/UDP icscf.home_b.com
    From: User_A<sip:ue_a@home_a.com>
    To: User_B <sip:ue_b@home_b.com>
    Call-ID: a@ue_a.home_a.com
    Cseq: 1 INVITE
    Content-Length: 829
    CAMEL: 23446321247984349
    Encryption: PGP version=2.6.2,encoding=ascii
        Message body In a second preferred embodiment of the invention, the I_CSCF adds the CAMEL-related information to the body of the SIP INVITE message. In the following example of a SIP INVITE message according to the second preferred embodiment of the invention, only the CAMEL-related information, coded to a digit string, is shown. In other embodiments of the invention each piece of CAMEL-related information may be given in separate message body rows or in one row in a predetermined order so that different information is separated by a comma, for example.

INVITE sip:ue_b@home_b.com SIP/2.0
    Via: SIP/2.0/UDP icscf.home_b.com
    From: User_A<sip:ue_a@home_a.com>
    To: User_B <sip:ue_b@home_b.com>
    Call-ID: a@ue_a.home_a.com
    Cseq: 1 INVITE
    Content-Length: 829
    Encryption: PGP version=2.6.2,encoding=ascii
        Message body starts . . .
        CAMEL: 23446321247984349
        . . . Message body ends Although the invention has been described above with the CAMEL call reference number and the address of the I_CSCF, it is obvious to a person skilled in the art that other corresponding information needed in a call state control function for CAMEL services may also be transmitted in the SIP INVITE message from the I_CSCF to the T_CSCF and generated in the I_CSCF, if needed.

Although the invention has been described above assuming that the I_CSCF generates the CAMEL call reference number (and corresponding information), it is obvious to a person skilled in the art that some other network node, such as the HSS, may also generate the needed information and send it to the I_CSCF, which then just adds this information to the SIP INVITE message.

Although the invention has been described above assuming that the CAMEL-related information is added in the I_CSCF, it is obvious to a person skilled in the art that CAMEL-related invention may also be added to a SIP INVITE message by the caller's serving call state control function O_CSCF. In this embodiment the I_CSCF may pass the CAMEL-related information to the T_CSCF as such, modify the information or add some further information before relaying the information in the SIP INVITE message to the T_CSCF, or pass no CAMEL-related information it received in the SIP INVITE message to the T_CSCF. For example, the I_CSCF may receive the CAMEL call reference number from the O_CSCF in the SIP INVITE message and add only the address of the I_CSCF to the SIP INVITE message before sending it to the T_CSCF.

Although the invention has been described above assuming that the CAMEL-related information is transmitted in a SIP INVITE message, it is obvious to a person skilled in the art that CAMEL-related information may be added to a response message acknowledging the SIP INVITE message or a corresponding message invoking a session. The response message can be a final response, such as '200 OK' or a provisional response, such as '100 Trying' or '183 Session progress'. In this embodiment the CAMEL-related information is added in a network node sending the SIP response message, such as the call state control function serving the terminating subscriber T_CSCF. It is even possible to utilize both messages to transmit CAMEL-related information. For example, the I_CSCF may add its address to the SIP INVITE message and the T_CSCF may generate the CAMEL call reference number and add it to the response message acknowledging the SIP INVITE message.

Although the invention has been described above assuming that the address of the I_CSCF is used instead of the address of the GMSC as mandatory CAMEL-related information, it is obvious to a person skilled in the art that the address of another network node, such as the T_CSCF or O_CSCF, may also be used instead of the address of the GMSC.

It will be obvious to a person skilled in the art that, as the technology advances, the inventive concept can be implemented in various ways. The invention and its embodiments are not limited to the examples described above but may vary within the scope of the claims.

What is claimed is:

1. A method for providing a network node serving a called subscriber with CAMEL-related information in an IP-based system using SIP, wherein the method comprises:
    routing a call to the network node via an entry point for the called subscriber;
    generating a CAMEL call reference number for the call in the entry point;
    adding at least the CAMEL call reference number and the address of the entry point as CAMEL-related information to the SIP INVITE message; and
    sending the SIP INVITE message to the network node.

2. A method-comprising:
    routing a call to a network node serving a called subscriber via an entry point for the called subscriber;

generating a CAMEL call reference number for the call in the entry point;

coding the CAMEL call reference number and the address of the entry point in a digit string;

adding at least the digit string as CAMEL-related information to a SIP INVITE message; and sending the SIP INVITE message to the network node.

3. A method comprising:

receiving a SIP INVITE message in a network node serving a called subscriber from an entry point for the called subscriber;

generating a CAMEL call reference number for the call in the network node;

adding at least the CAMEL call reference number and the address of the network node as CAMEL-related information to a SIP response message acknowledging SIP INVITE message; and sending the SIP response message to the entry point.

4. A method comprising:

receiving a SIP INVITE message in a network node serving a called subscriber from an entry point for the called subscriber;

generating a CAMEL call reference number for the call in the network node;

coding the CAMEL call reference number and the address of the network node in a digit string;

adding the digit string as CAMEL-related information to a SIP response message acknowledging the SIP INVITE message; and sending the SIP response message to the entry point.

5. A communications system using SIP for IP telephony and providing a CAMEL service, comprising at least user equipment;

a first network node; and a second network node, wherein the first network node is arranged to add CAMEL-related information relating to a call made to the user equipment to a SIP message and to send the SIP message to the second network node; and the second network node is arranged to separate the CAMEL-related information from the SIP message.

6. A communications system according to claim 5, wherein the first network node is arranged to generate a CAMEL call reference number and to add at least the CAMEL call reference number and its address as CAMEL-related information to the SIP message.

7. A communications system according to claim 5, wherein the first network node is arranged to generate a CAMEL call reference number, to code at least the CAMEL call reference number and its own address to a digit string and to add at least the digit string as CAMEL-related information to the SIP message; and the second network node is arranged to decode the digit string.

8. A communications system according to claim 5, wherein the SIP message is a SIP INVITE message comprising CAMEL-related information in the header of the SIP INVITE message.

9. A communications system according to claim 5, wherein the SIP message is a SIP INVITE message comprising CAMEL-related information in the body of the SIP INVITE message.

10. A communications system using SIP for IP telephony and providing a CAMEL service, comprising at least user equipment;

a first network node; and a second network node, wherein the first network node is arranged to add first CAMEL-related information relating to a call made to the user equipment to a SIP INVITE message, to send the SIP INVITE message to the second network node, to receive a SIP response message acknowledging the SIP INVITE message and to separate second CAMEL-related information relating to the call from the SIP response message; and the second network node is arranged to separate the first CAMEL-related information from the SIP INVITE message, to add the second CAMEL-related information to the SIP response message and to send the SIP response message to the first network node.

11. A communications system according to claim 10, wherein the first CAMEL-related information includes at least the address of the first network node, the second network node is further arranged to generate a CAMEL call reference number; and the second CAMEL-related information includes at least the CAMEL call reference number.

12. A communications system according to claim 10, wherein the first network node is further arranged to generate a CAMEL call reference number; and the first CAMEL-related information includes at least the generated CAMEL call reference number; and the second CAMEL-related information includes at least the address of the second network node.

13. A network node in a communications system using SIP and providing a CAMEL service, wherein the network node comprises means for adding CAMEL-related information to a SIP message.

14. A network node in a communications system using SIP and providing a CAMEL service, wherein the network node comprises means for generating a CAMEL call reference number and means for adding at least the CAMEL call reference number as CAMEL-related information to a SIP message.

15. A method according to claim 2, wherein the CAMEL-related information is added to the header of the IP telephony signaling protocol message.

16. A method according to claim 2, wherein the CAMEL-related information is added to the body of the SIP message.

17. A method according to claim 3, wherein the CAMEL-related information is added to the header of the IP telephony signaling protocol message.

18. A method according to claim 3, wherein the CAMEL-related information is added to the body of the SIP message.

19. A method according to claim 4, wherein the CAMEL-related information is added to the header of the IP telephony signaling protocol message.

20. A method according to claim 4, wherein the CAMEL-related information is added to the body of the SIP message.

* * * * *